No. 721,888. PATENTED MAR. 3, 1903.
S. V. N. HAMILTON.
HORSESHOE.
APPLICATION FILED OCT. 24, 1902.
NO MODEL. 2 SHEETS—SHEET 1.
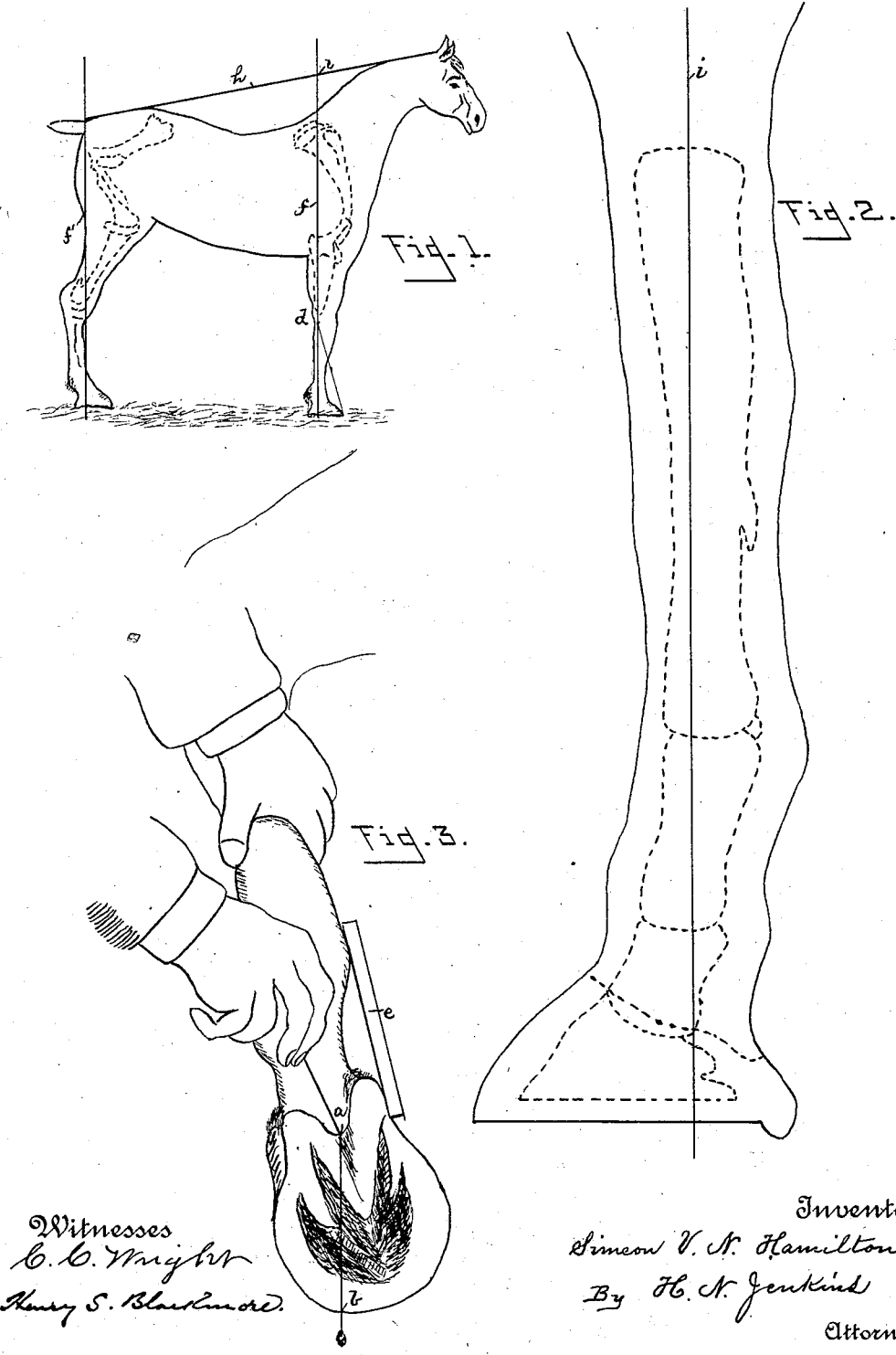

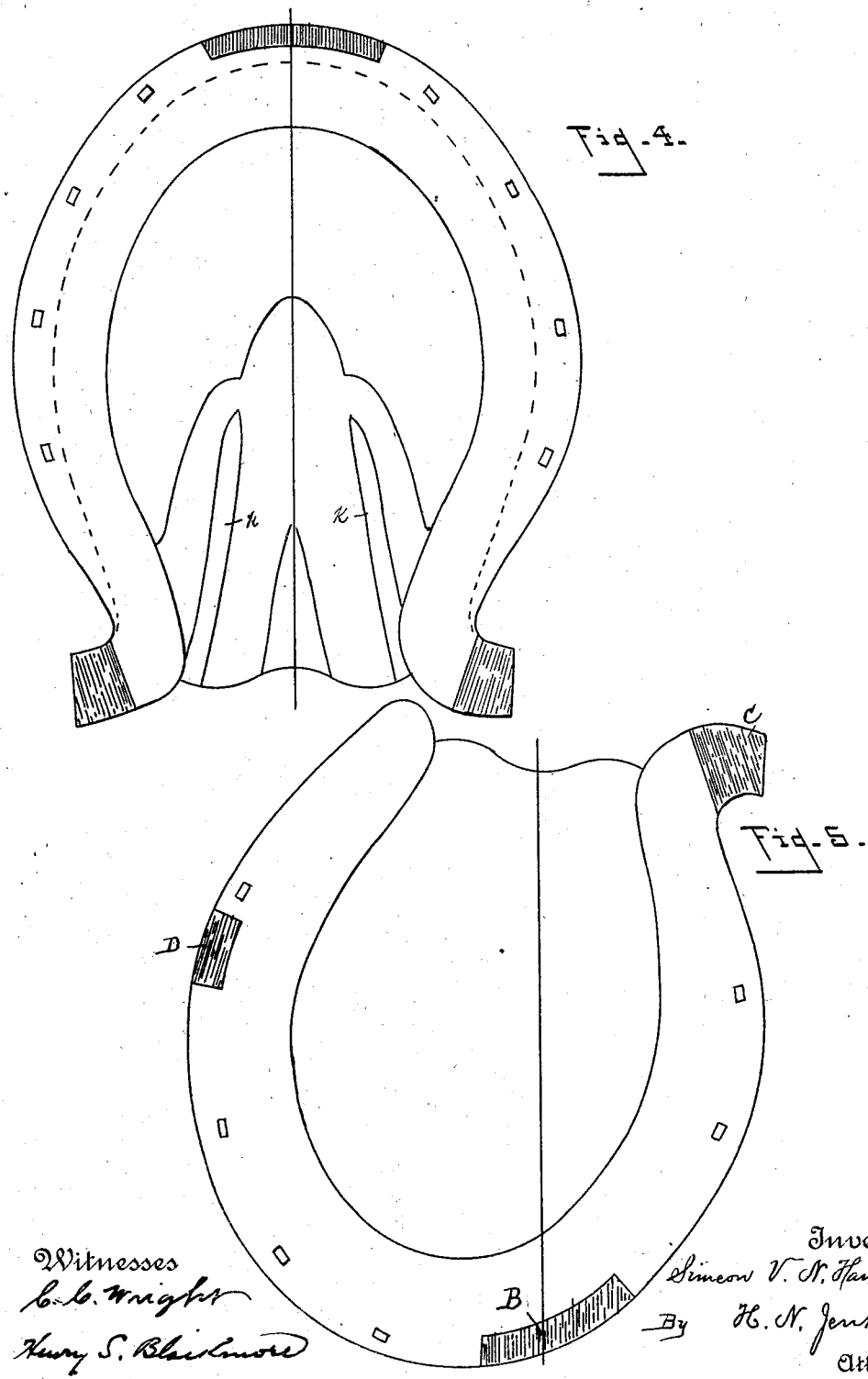

UNITED STATES PATENT OFFICE.

SIMEON V. N. HAMILTON, OF WINCHESTER, VIRGINIA.

HORSESHOE.

SPECIFICATION forming part of Letters Patent No. 721,888, dated March 3, 1903.

Application filed October 24, 1902. Serial No. 128,632. (No model.)

*To all whom it may concern:*

Be it known that I, SIMEON V. N. HAMILTON, a citizen of the United States, residing at Winchester, in the county of Frederick and State of Virginia, have invented new and useful Improvements in Horseshoes, of which the following is a specification.

This invention relates to the art of shoeing horses, its object being to enable a farrier to shoe an animal with the utmost precision whether the animal be deformed or of perfect shape.

Heretofore in the shoeing of horses it has been a matter of guesswork with the farrier as to the requisite paring of the animal's hoof and of the location of the shoe-calks to insure comfort and safety, as well as to secure the best results for the amount of power exerted by the animal.

Referring to the accompanying drawings, Figure 1 represents in outline a perfect horse; Fig. 2, one of the legs thereof, with the bones shown in dotted lines. Fig. 3 is intended to show how the location of front calk is obtained; Fig. 4, the under side of a perfect foot and shoe, and Fig. 5 the under side of a deformed foot provided with my improved shoe.

From the above it will be seen that my invention relates to the shoeing of all classes of deformed feet according to the rules laid down in this chart.

There are three classes of horses to shoe— viz., the natural horse, the "paddler," and the commonly-called "nigger-toed," in the latter the legs interfering with each other.

The essential feature of my invention is to locate the point at which the animal's foot strikes the ground and which is the last point to leave the same, this being the natural point for the toe-calk of the shoe. The proper way to get this point is to grasp the animal's shank and raise the leg so that its foot shall hang naturally, as shown in Fig. 3, then suspend a plumb-line from the center of the frog $a$, and the point at which the line intersects the outside of the hoof $b$ will indicate the point required for the location of the toe-calk. I next place a straight-edge $e$ outside the upper and lower pastern-joints, and the point at which the lower end of the straight-edge touches the hoof will indicate the proper location for the rear calk, and, further, the distance thus obtained to the middle of the frog will give one-half the width of the heel. The location for the third calk is found by measuring from the center of the heel-calk C around the hoof to the center of the toe-calk B and carrying the line around the outside of the hoof for a like distance to D.

The relative height of the rear calk is obtained in the following manner: Referring to Fig. 1, I draw a line $h$ from a point between the ears of the animal to the root of its tail, and from this line at a point $i$ one-third distant from the animal's ears I drop a plumbline $f$. In the natural horse this line $f$ will strike the withers and, continued down, will strike one-third from the heel and two-thirds from the toe. The distance from the center of the knee-joint to the toe should equal the measurement from the same point to the heel in the natural horse; but in the deformed horse it is liable to vary from one to three inches and in this case make the height of the heel-calks two-thirds of the difference between the two measurements and the height of the toe-calk one-third of the difference. In this way the foot of the animal will be caused to assume a natural position and any unnatural strain in the tendons will be relieved.

In shoeing the rear feet of a horse drop a plumb-line $f'$ from the root of the tail to the hoof, which will bring the line two-thirds of the distance from the toe to the heel, as in the front leg. In measuring deformed horses measure to the plumb-line at the joint $d$ instead of the center of the joint.

In paring horses' hoofs cut the toe to its proper point, then measure the height of the hoof to the hair at the front thereof, and divide it by three, which will give the height of the heel. Pare a horse's hoof level. Cut the lines of the frog $k$, Fig. 4, out at the heel in order to give the frog room.

Having now described my invention, what I claim as new, and desire to secure by Letters Patent, is—

1. A horseshoe having heel-calks situated at points which, measured along the curve of the shoe, are substantially equidistant from a predetermined point at one side of the center of the toe, said predetermined point being in the same vertical line as the center of the frog of the foot of the horse to which the shoe is to be fitted when the foot is lifted and the bottom of the foot is in a vertical plane, substantially as set forth.

2. A horseshoe having a heel-calk situated in a line running from the center of the frog to a line drawn along the sides of the pastern-joints, a toe-calk situated at one side of the center of the toe, and a second heel-calk situated at the same distance, measured around the curve of the shoe, from the toe-calk as the first-named heel-calk, substantially as set forth.

In testimony whereof I have hereunto set my hand this 23d day of October, A. D. 1902.

SIMEON V. N. HAMILTON.

Witnesses:
HENRY S. BLACKMORE,
C. C. WRIGHT.